April 22, 1952 L. H. KAUPKE 2,593,679
IMPLEMENT ATTACHING STRUCTURE
Filed Dec. 4, 1948 3 Sheets-Sheet 1

Inventor
Lee H. Kaupke

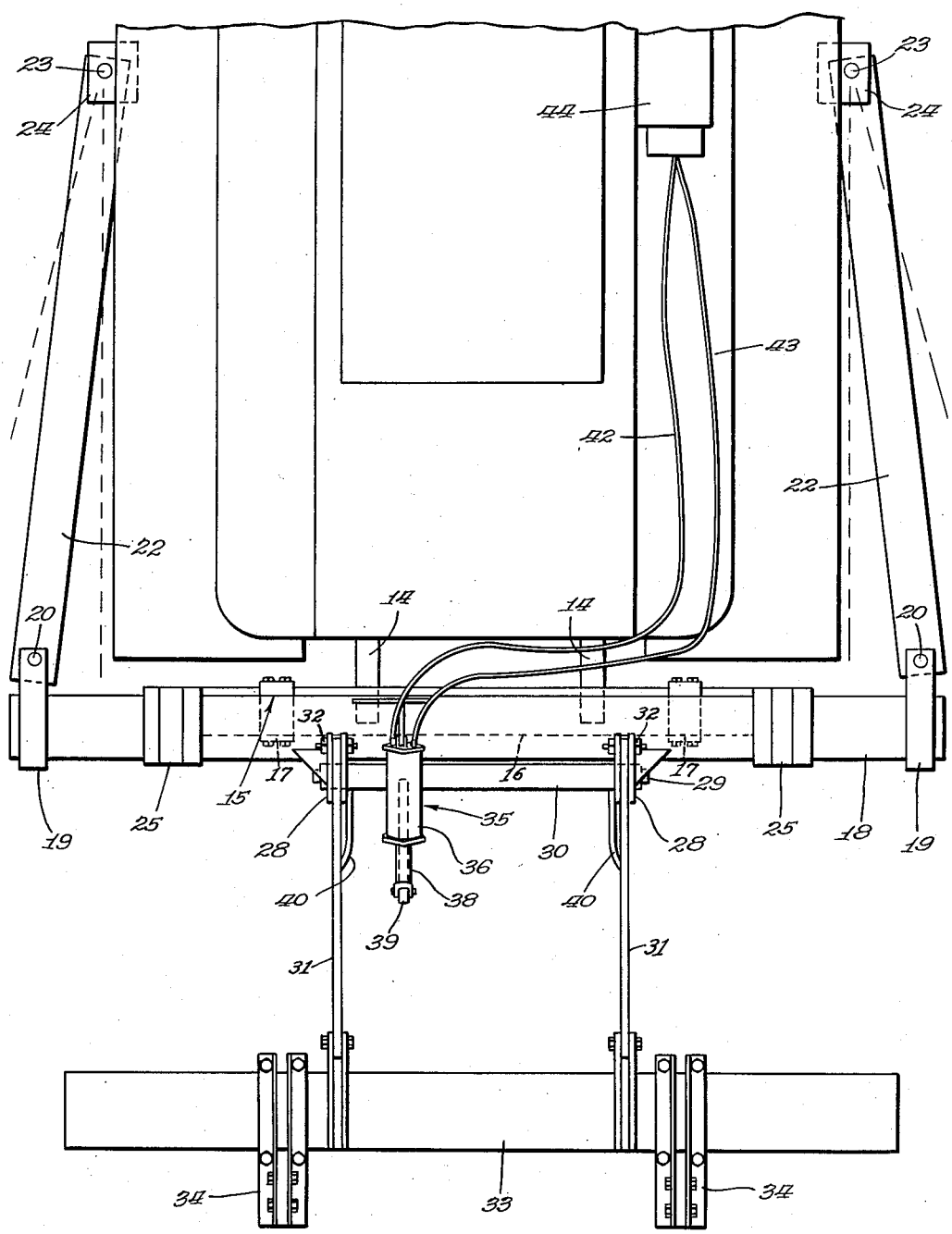

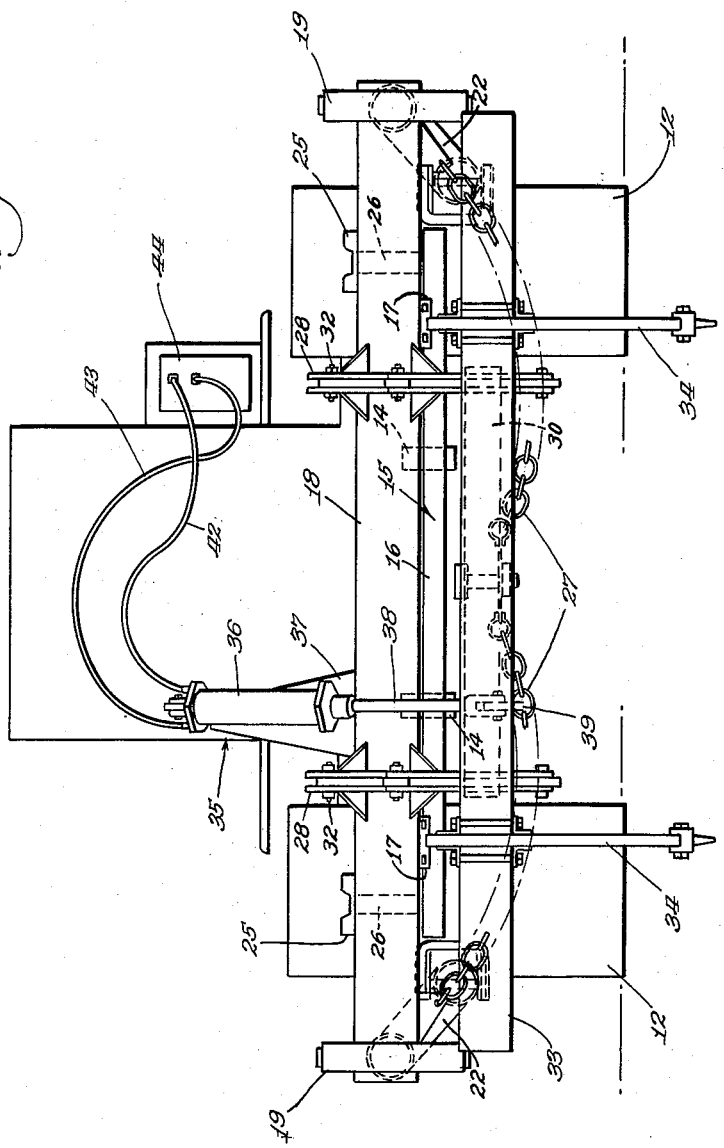

Patented Apr. 22, 1952

2,593,679

UNITED STATES PATENT OFFICE 2,593,679

IMPLEMENT ATTACHING STRUCTURE

Lee H. Kaupke, Stockton, Calif., assignor to International Harvester Company, a corporation of New Jersey Application December 4, 1948, Serial No. 63,504

7 Claims. (Cl. 97—50)

This invention relates to agricultural implements and particularly to tractor-mounted implements. More specifically, the invention concerns mechanism by which an implement may be attached to and controlled from a tractor.

In mounting implements upon tractors of the track-laying or crawler type, difficulty has been experienced with implements so attached that they cannot follow the path of the tractor with the result that they are frequently kicked out of line when the tractor is turned or steered and the implement is frequently damaged. It is especially important in this type of tractor that the implement be able to follow the path of the tractor without being subjected to the jerky movements participated in by the tractor incident to the steering thereof. The principal object of the present invention, therefore, is the provision of an attaching structure for mounting an implement upon a tractor wherein the danger of injury to the implement in the turning of the tractor is minimized or eliminated.

Another object of the invention is to provide in an attaching structure for a tractor of the crawler type a drawbar which is capable of lateral swinging movement in response to steering of the tractor and to which may be attached an implement which may swing therewith.

It is known to attach drawbars to crawler tractors by elongated arms which are attached to the track frames between the front and rear of the tractor and at the sides thereof. These arms have been pivoted upon a transverse axis to accommodate vertical movement of the drawbar in response to changes in ground contour and the like. Implements mounted upon drawbars so secured to the tractor have been difficult to control, particularly as regards their depth of operation inasmuch as the pitch of the earth-working tool varies throughout the arc of movement thereof as it rises about the pivot of the drawbar upon the tractor. Therefore, another object of the present invention is to provide an implement attaching structure for a crawler type tractor offering more accurate control of the operating depth of the working tool.

A further object of the invention is to provide for a tractor a drawbar which is held in fixed vertical location with respect to the tractor by guide means which allows the drawbar to swing laterally in response to turning of the tractor, the earth working tools being mounted upon the drawbar and swingable therewith by a parallel link arrangement which permits the earth working tools to rise and fall in a substantially vertical line.

Other objects and advantages of the invention will become clear from the following detailed description when read in conjunction with the accompanying drawings wherein:

Fig. 2 is a plan view of the tractor shown in Fig. 1.

Fig. 3 is a rear elevation of the structure shown in Figs. 1 and 2.

Figure 1:
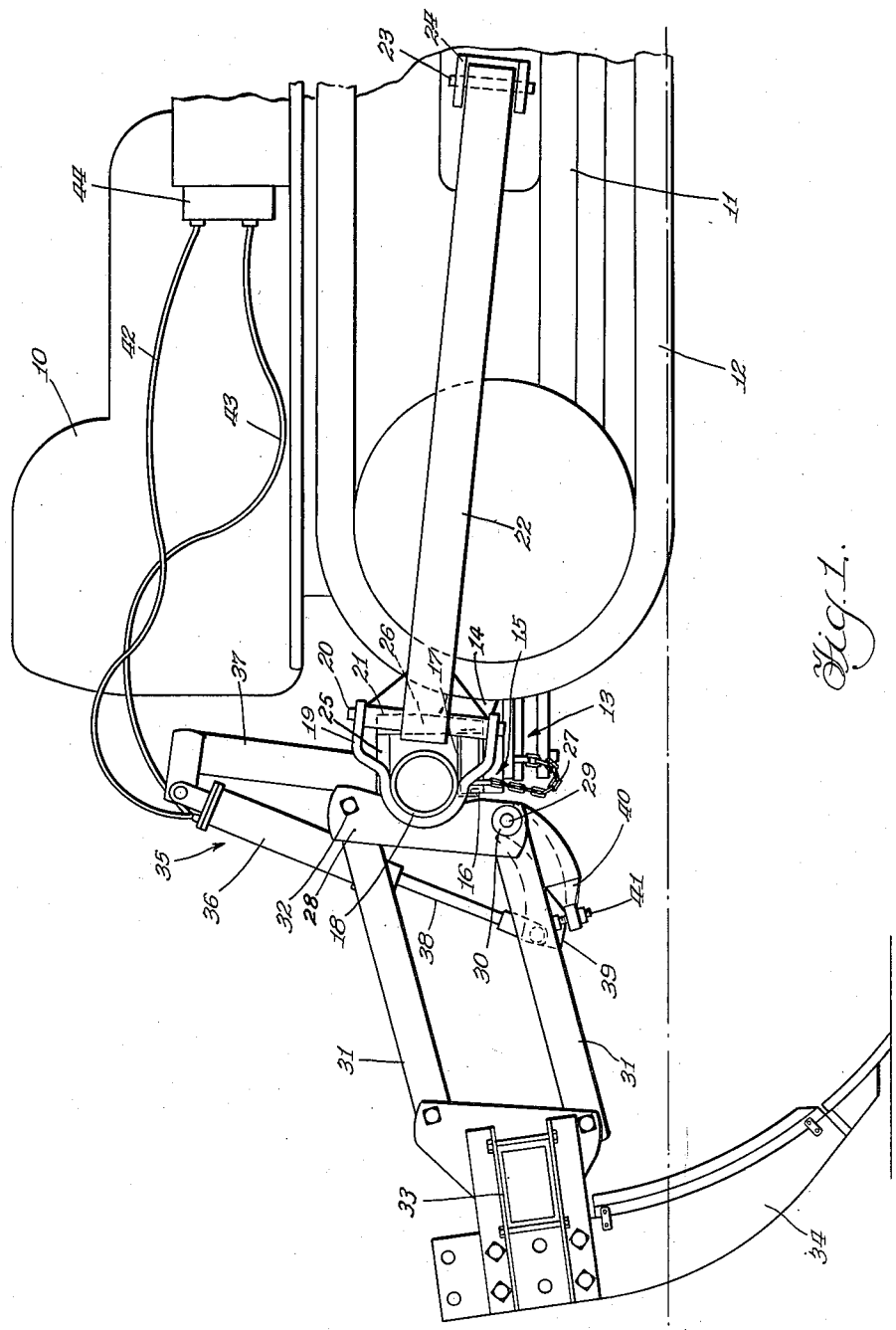
Fig. 1 is a view in side elevation of the rear portion of a crawler tractor showing an implement embodying the features of the present invention mounted thereupon.

Referring to the drawings, the tractor upon which the implement embodying the features of the present invention is mounted is designated by the numeral 10. This tractor is provided with a track frame 11, one on each side of the tractor body, and endless tracks 12.

Secured to the tractor body and extending rearwardly therefrom is a bracket structure 13 which comprises laterally spaced attaching members 14 to which are secured a transversely extending track or guide 15. Guide 15 extends transversely of the tractor to opposite sides of the body thereof and is formed of a channel iron 16 upon which are mounted at laterally spaced locations two or more plates 17. This channel member 16 and the plates 17 mounted thereon serve as a support for a transversely extending drawbar 18 in the form of a cylindrical pipe which extends to opposite sides of the tractor and laterally beyond the tracks 12.

At each end of the pipe 18 there is secured a yoke 19 apertured at its ends to receive a generally vertically extending pivot pin 20 mounted in a bearing 21 carried at the end of a longitudinally extending arm 22. Arm 22 at each end of the drawbar 18 extends along the sides of the tractor forwardly and is pivotally connected to the track frame 11 at each side of the tractor by a generally vertically extending pivot pin 23 carried in a bracket 24 secured to the track frame.

It will thus be seen that each of the arms 22 is allowed to swing laterally about the pivot pins 23 and the arms 22 form a unit with the drawbar pipe 18 so that the drawbar 18 swings transversely upon the surface of the plates 17 carried by the channel member 16. The drawbar 18 is confined and held against vertical displacement throughout the range of lateral swinging thereof upon the channel member 16 of the bracket 13 by a pair of guide members 25, each of which is carried upon a standard 26 affixed to the channel member 16. Each member 25 lies adjacent the upper surface of the drawbar 18 and extends parallel to the channel member 16. The bracket member 13 with the channel 16 and the guide plates 25 thus provides a track or guide means for confining the drawbar and holding it in a fixed vertical position with respect to the tractor while accommodating lateral movement thereof. Lateral swinging of the drawbar is limited by flexible elements comprising chains 27 secured at one end to the bracket 13 and at the other ends to the opposite ends of the drawbar.

The drawbar 18 serves for the attachment to the tractor of earth working tools and for this purpose a pair of laterally spaced attaching structures 28 are secured to and form a part of the drawbar. The lower portion of this structure is provided with an opening to receive a shaft 29 extending transversely parallel to the drawbar 18 and having mounted thereupon a sleeve 30. Likewise mounted upon the shaft 29 are laterally spaced lower parallel links 31. A pair of laterally spaced upper parallel links 31 are pivotally connected at their forward ends to the upper portion of the attaching members 28 by bolts 32. The rear ends of these links 31 carry a transversely extending tool bar 33 upon which are mounted at laterally spaced locations earth working tools 34.

Due to the parallel link connection of the tool bar 33 and the tools 34 to the drawbar 18 the earth working tools are capable of free vertical floating movement with respect to the tractor in order to follow changes in ground contour. The tools are likewise laterally swingable with the drawbar 18 and the arms 22 when the tractor is turned. The implement is raised and lowered with respect to the drawbar of the tractor by mechanism including a hydraulic ram unit 35 comprising a cylinder 36 pivotally mounted upon a standard 37 secured to and extending upwardly from the pipe 16 and a piston rod 38 pivotally connected to a rock arm 39 mounted upon the sleeve 30. Likewise mounted upon the sleeve 30 are a pair of laterally spaced lift arms 40, each of which is apertured at its end to receive a threaded bolt 41 and is curved so that the head of the bolt 41 abuts against the lower edge of each of the lower parallel links 31. Hydraulic fluid is supplied to the cylinder 36 through flexible hose lines 42 and 43 from a source indicated at 44 on the tractor and deriving power therefrom.

It will be noted that when the piston rod 38 is extended the implement will be at its lowest or operating position as indicated in Fig. 1. Upon retraction of the piston rod 38 within the cylinder the arm 39 is rocked upwardly so that lift arms 40 and bolts 41 carried thereby engage the lower links 31 and raise the implement upwardly with respect to the drawbar and with respect to the tractor into a transport position. The position of each of the lifting arms 40 with respect to the lower link 31 of the parallel link system is adjusted merely by adjusting the position of the bolt 41.

From the foregoing description it will be noted that applicant has devised a novel implement attaching structure for tractors. While the invention has been described in its preferred embodiment it should be understood that modifications may be made therein without departing from the spirit of the invention or the scope of the appended claims.

What is claimed is:

1. An implement attaching structure for a tractor having attaching elements at the sides thereof between front and rear, comprising a pair of draft members extending longitudinally of the tractor at opposite sides thereof and connected to said elements intermediate the ends of the tractor for lateral swinging about vertical axes, a drawbar extending transversely of the tractor at the rear thereof and pivotally connected to the ends of said draft members for relative pivotal movement about vertical axes, a bracket secured to the rear of the tractor having a transverse portion parallel to the drawbar, guide means carried by the bracket adapted to confine and support said bar in fixed vertical position during lateral swinging thereof, generally parallel links pivoted to said drawbar and extending rearwardly therefrom, and a transverse tool bar pivotally mounted at the rear ends of said links for carrying earth working tools, said links being vertically swingable about their pivots upon the drawbar to raise and lower the tools.

2. An implement structure for a tractor comprising a drawbar at the rear of the tractor extending transversely thereof, connecting members extending from the ends of the drawbar forwardly and pivotally connected to the tractor for lateral swinging of the drawbar relative thereto, a bracket secured to the rear of the tractor having vertically spaced guide members adapted to confine and maintain said bar against vertical displacement during lateral swinging thereof, vertically spaced generally parallel links pivoted to the drawbar and extending rearwardly therefrom, a transverse tool-carrying bar at the ends of said links, and a power operated ram unit mounted on said drawbar and movable therewith, said ram unit being connected to said links for raising and lowering the tools.

3. An implement attaching structure for a crawler type tractor having laterally spaced track frames comprising a transverse rigid drawbar at the rear of the tractor extending to opposite sides thereof, a pair of arms connected to the ends of said drawbar on vertical pivots and extending forwardly along the sides of the tractor, means for connecting the forward ends of the arms to the track frames intermediate the ends of the tractor on vertical pivots whereby the drawbar may swing laterally with respect to the tractor, means carried by the tractor for holding the drawbar at a fixed height above the ground including guide means adapted to support and confine said drawbar throughout the range of transverse swinging thereof, and means for attaching a tool-carrying bar to the drawbar for vertical movement with respect thereto between operating and transport positions.

4. An implement attaching structure for a crawler type tractor having laterally spaced track frames comprising a transverse rigid drawbar at the rear of the tractor extending to opposite sides thereof, a pair of arms connected to the ends of said drawbar on vertical pivots and extending forwardly along the sides of the tractor, means for connecting the forward ends of the arms to the track frames intermediate the ends of the tractor on vertical pivots whereby the drawbar may swing laterally with respect to the tractor, means carried by the tractor for holding the drawbar at a fixed height above the ground including guide means adapted to support and confine said drawbar throughout the range of transverse swinging thereof, means for attaching a tool carrying bar to the drawbar for vertical movement with respect thereto between operating and transport positions, a transverse rock shaft carried by the drawbar, an arm on the rock shaft, a power operated ram unit anchored to the drawbar having a piston connected to the arm on the rock shaft for rocking the latter, said ram unit deriving power from the tractor through flexible connections accommodating lateral swinging of the drawbar and ram unit.

5. An implement attaching structure for a crawler type tractor having laterally spaced track frames comprising a transverse rigid drawbar at the rear of the tractor extending to opposite sides thereof, a pair of arms connected to the ends of said drawbar on vertical pivots and extending forwardly along the sides of the tractor, means for connecting the forward ends of the arms to the track frames intermediate the ends of the tractor on vertical pivots whereby the drawbar may swing laterally with respect to the tractor, means carried by the tractor for holding the drawbar at a fixed height above the ground including guide means adapted to support and confine said drawbar throughout the range of transverse swinging thereof, means for attaching a tool carrying bar to the drawbar for vertical movement with respect thereto between operating and transport positions, a transverse rock shaft carried by the draw-bar, an arm on the rock shaft, a power operated ram unit anchored to the drawbar having a piston connected to the arm on the rock shaft for rocking the latter, said ram unit deriving power from the tractor through flexible connections accommodating lateral swinging of the drawbar and ram unit, and a one-way connection between the rock-shaft and the tool-carrying bar for lifting the latter while permitting free floating movement of the tool bar in operating position of the tools.

6. An implement attaching structure for a crawler type tractor having laterally spaced track frames comprising a transverse rigid drawbar at the rear of the tractor extending to opposite sides thereof, a pair of arms connected to the ends of said drawbar on vertical pivots and extending forwardly along the sides of the tractor, means for connecting the forward ends of the arms to the track frames intermediate the ends of the tractor on vertical pivots whereby the drawbar may swing laterally with respect to the tractor, and means carried by the tractor for holding the drawbar at a fixed height above the ground comprising a bracket structure secured to the tractor body having a transverse portion arranged to support said drawbar and guide elements overhanging the upper portion of the drawbar to confine and guide the latter throughout the range of lateral movement thereof.

7. An implement attaching structure for a crawler type tractor having laterally spaced track frames comprising a transverse rigid drawbar at the rear of the tractor extending to opposite sides thereof, a pair of arms connected to the ends of said drawbar on vertical pivots and extending forwardly along the sides of the tractor, means for connecting the forward ends of the arms to the track frames intermediate the ends of the tractor on vertical pivots whereby the drawbar may swing laterally with respect to the tractor, means carried by the tractor for holding the drawbar at a fixed height above the ground comprising a bracket structure secured to the tractor body having a transverse portion arranged to support said drawbar and guide elements overhanging the upper portion of the drawbar to confine and guide the latter throughout the range of lateral movement thereof, and flexible means connected between the tractor and the ends of said drawbar for limiting the lateral swinging thereof.

LEE H. KAUPKE.

REFERENCES CITED

The following references are of record in the file of this patent:

UNITED STATES PATENTS

| Number | Name | Date |
| --- | --- | --- |
| 696,808 | Gatling | Apr. 1, 1902 |
| 1,204,226 | Wyles, Jr. | Nov. 7, 1916 |
| 2,036,911 | Barrentine | Apr. 7, 1936 |
| 2,140,712 | Mitchell | Dec. 20, 1938 |
| 2,338,334 | Kastenschmidt | Jan. 4, 1944 |
| 2,444,321 | Wooldridge | June 29, 1948 |